United States Patent
Li

(10) Patent No.: US 11,853,153 B2
(45) Date of Patent: Dec. 26, 2023

(54) MULTI-THREAD EXIT METHOD AND MOBILE TERMINAL

(71) Applicant: AUTEL ROBOTICS CO., LTD., Guangdong (CN)

(72) Inventor: Zhaozao Li, Guangdong (CN)

(73) Assignee: AUTEL ROBOTICS CO., LTD., Guangdong (CN)

( * ) Notice: Subject to any disclaimer, the term of this patent is extended or adjusted under 35 U.S.C. 154(b) by 95 days.

(21) Appl. No.: 17/536,421

(22) Filed: Nov. 29, 2021

(65) Prior Publication Data

US 2022/0083416 A1 Mar. 17, 2022

Related U.S. Application Data

(63) Continuation of application No. PCT/CN2020/092645, filed on May 27, 2020.

(30) Foreign Application Priority Data

May 28, 2019 (CN) .......................... 201910453615.2

(51) Int. Cl.
*G06F 11/00* (2006.01)
*G06F 11/07* (2006.01)
*G06F 9/30* (2018.01)

(52) U.S. Cl.
CPC ........ *G06F 11/0793* (2013.01); *G06F 9/3009* (2013.01); *G06F 11/0778* (2013.01);
(Continued)

(58) Field of Classification Search
CPC .............. G06F 9/3009; G06F 11/0778; G06F 11/0793; G06F 11/0796
See application file for complete search history.

(56) References Cited

U.S. PATENT DOCUMENTS 6,418,542 B1 7/2002 Yeager
9,274,894 B1 * 3/2016 Perry .................. G06F 11/0706
(Continued)

FOREIGN PATENT DOCUMENTS

CN 106681811 A 5/2017
CN 107861817 A 3/2018
(Continued)

OTHER PUBLICATIONS

The Supplementary European Search Report dated May 10, 2022; Appln. No. 20814356.0.
(Continued)

*Primary Examiner* — Joshua P Lottich

(57) ABSTRACT

Embodiments of the present invention relate to a multi-thread exit method and a mobile terminal. The method is applicable to the mobile terminal. The method includes: obtaining an exit identifier and crash determination information of a thread; and destroying the thread according to the exit identifier and the crash determination information. In the method, an exit identifier and crash determination information of a thread are obtained, both the exit identifier and the crash determination information of the thread are determined, and different destruction modes are selected according to determination results to destroy the thread, thereby avoiding crash and congestion when a multi-thread exits and improving the stability of multi-thread exit.

11 Claims, 4 Drawing Sheets

(52) U.S. Cl.
CPC ...... *G06F 11/0796* (2013.01); *G06F 2201/85* (2013.01); *G06F 2201/865* (2013.01)

(56) References Cited

U.S. PATENT DOCUMENTS

| | | | |
|---|---|---|---|
| 2014/0380283 A1* | 12/2014 | Hu | G06F 8/433 |
| | | | 717/132 |
| 2015/0277947 A1 | 10/2015 | Busaba et al. | |
| 2015/0347220 A1* | 12/2015 | Hermany | G06F 11/0775 |
| | | | 714/48 |
| 2022/0114572 A1* | 4/2022 | Dunsmore | G06F 11/0778 |

FOREIGN PATENT DOCUMENTS

| | | |
|---|---|---|
| CN | 107967176 A | 4/2018 |
| CN | 108052390 A | 5/2018 |
| CN | 108052396 A | 5/2018 |
| CN | 108804211 A | 11/2018 |
| CN | 110362389 A | 10/2019 |

OTHER PUBLICATIONS

International Search Report dated Aug. 26, 2020; PCT/CN2020/092645 with English Translation.
Java Code Thread, Feb. 21, 2011.
Java Code Thread, posted Feb. 15, 2019.

* cited by examiner

MULTI-THREAD EXIT METHOD AND MOBILE TERMINAL

CROSS-REFERENCE TO RELATED APPLICATIONS

The present application is a continuation of International Application No. PCT/CN2020/092645, filed on May 27, 2020, which claims priority to Chinese Patent Application No. 201910453615.2, filed on May 28, 2019, which is incorporated herein by reference in its entirety.

TECHNICAL FIELD

The present application relates to the field of microprocessor architecture technologies, and in particular, to a multi-thread exit method and a mobile terminal.

BACKGROUND

A multi-threaded apartment (MTA) has only one block rather than a plurality of blocks in each process. Such a single block controls a plurality of threads rather than a single thread. An application program that adopts multi-threading technology can make better use of system resources. A main advantage of the application program is that an idle time slice of a central processing unit (CPU) is fully utilized, and it takes as little time as possible to make a response to a user requirement, so that overall operating efficiency of a process is greatly improved and the application program is more flexible. More importantly, because all threads of the same process share the same memory, there is no need for a special data transfer mechanism, and it is not necessary to establish a shared storage area or shared file, making it easier to resolve issues such as coordinated operations and running, data exchange and resource allocation between different tasks.

However, in a device program or terminal application (APP), there is usually a thread that performs operations cyclically, and when another thread operation exits such a cycling thread, inappropriate handling may cause crash and congestion.

SUMMARY

To resolve the foregoing technical problem, embodiments of the present invention provide a multi-thread exit method and a mobile terminal that avoid crash and congestion when a multi-thread exits.

To resolve the foregoing technical problem, the embodiments of the present invention provide the following technical solution: a multi-thread exit method. The multi-thread exit method includes:

obtaining an exit identifier and crash determination information of a thread; and destroying the thread according to the exit identifier and the crash determination information.

Optionally, the obtaining crash determination information of a thread includes:

monitoring an exit duration of the thread, where the exit duration is a duration between a current time point and a time point at which the thread is set to enter an exit state; and determining whether the exit duration satisfies a preset reference duration condition, to obtain a determination result, and using the determination result as the crash determination information.

Optionally, the exit identifier includes a first exit identifier and a second exit identifier; and the destroying the thread according to the exit identifier and the crash determination information includes:

destroying the thread if the exit identifier is the first exit identifier; and destroying the thread if the exit identifier is the second exit identifier and the exit duration satisfies the preset reference duration condition.

Optionally, when the exit identifier is the second exit identifier, the method further includes:

continuing to monitor the exit duration of the thread if the exit duration does not satisfy the preset reference duration condition.

Optionally, the continuing to monitor the exit duration of the thread if the exit duration does not satisfy the preset reference duration condition includes:

continuing to monitor the exit duration of the thread after a wait of a preset duration.

Optionally, before the obtaining an exit identifier and crash determination information of a thread, the method further includes:

setting an exit indication identifier and an initial count value, where the exit indication identifier is used for instructing the thread to enter the exit state and output the first exit identifier, and the initial count value is used for indicating the time point at which the thread is set to enter the exit state.

Optionally, the monitoring the exit duration of the thread includes:

setting a count value i, and setting the initial count value to 0;

determining whether the count value i is greater than or equal to a preset count threshold; and if the count value i is not greater than or equal to the preset count threshold, waiting the preset duration, updating the count value i according to an assignment formula: $i=i+1$, and returning to continue to determine whether the updated count value i is greater than or equal to the preset count threshold; or destroying the thread if the count value i is greater than or equal to the preset count threshold.

Optionally, the method further includes:

creating the thread; and setting an operation indication identifier, where the operation indication identifier is used for instructing the thread to enter an operation state.

Optionally, the exit indication identifier and the operation indication identifier share a position of a first register, where when the thread is set to enter the exit state, the position of the first register is set as the exit indication identifier; and when the thread is set to enter the operation state, the position of the first register is set as the operation indication identifier.

Optionally, the first exit identifier and the second exit identifier share a position of a second register, where when the thread is set to enter the exit state, the position of the second register is set as the first exit identifier; and when the thread is set to enter the operation state, the position of the second register is set as the second exit identifier.

Optionally, before the destroying the thread, the method further includes:

interrupting operation of the thread.

Optionally, the interrupting operation of the thread includes:

interrupting the operation of the thread according to operation content of the thread.

Optionally, the operation content includes a read/write operation on a file or a read/write operation on network data; and the interrupting the operation of the thread according to operation content of the thread includes:

when the operation content is a read/write operation on a file, interrupting the operation of the thread by closing the file; and when the operation content is a read/write operation on network data, interrupting the operation of the thread by disabling a network interface.

To resolve the foregoing technical problem, the embodiments of the present invention further provide the following technical solution: a mobile terminal. The mobile terminal is communicatively connected to an unmanned aerial vehicle. The mobile terminal includes at least one processor; and a memory communicatively connected to the at least one processor, the memory storing instructions executable by the at least one processor, the instructions being executed by the at least one processor, to cause the at least one processor to be capable of performing the multi-thread exit method.

Compared with the prior art, in the multi-thread exit method provided in the embodiments of the present invention, an exit identifier and crash determination information of a thread are obtained, both the exit identifier and the crash determination information of the thread are determined, and different destruction modes are selected according to determination results to destroy the thread, thereby avoiding crash and congestion when a multi-thread exits and improving the stability of multi-thread exit.

BRIEF DESCRIPTION OF THE DRAWINGS

One or more embodiments are exemplarily described with reference to the corresponding figures in the accompanying drawings, and the exemplary descriptions are not to be construed as limiting the embodiments. Components in the accompanying drawings that have same reference numerals are represented as similar components, and unless otherwise particularly stated, the figures in the accompanying drawings are not drawn to scale.

DETAILED DESCRIPTION

Figure 1:
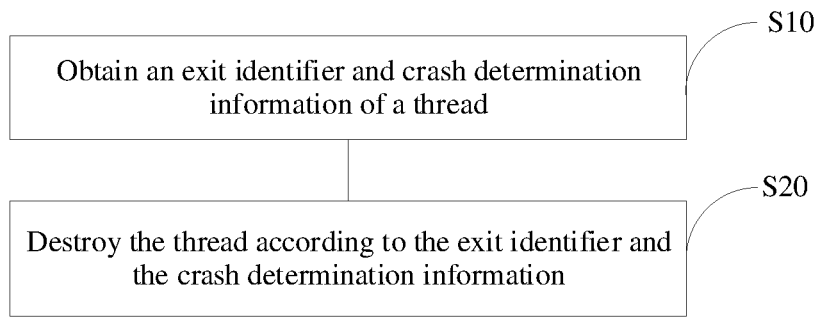
FIG. 1 is a schematic flowchart of a multi-thread exit method according to an embodiment of the present invention.

For ease of understanding the present invention, the present invention is described in more detail below with reference to the accompanying drawings and specific embodiments. It should be noted that when a component is expressed as "being fixed to" another component, the component may be directly on the another component, or one or more intermediate components may exist between the component and the another component. When one component is expressed as "being connected to" another component, the component may be directly connected to the another component, or one or more intermediate components may exist between the component and the another component. In the description of this specification, orientation or position relationships indicated by the terms such as "up", "down", "inside", "outside" and "bottom" are based on orientation or position relationships shown in the accompanying drawings, and are used only for ease and brevity of illustration and description of the present invention, rather than indicating or implying that the mentioned apparatus or component needs to have a particular orientation or needs to be constructed and operated in a particular orientation. Therefore, such terms should not be construed as limiting of the present invention. In addition, terms "first", "second" and "third" are only used to describe the objective and cannot be understood as indicating or implying relative importance.

Unless otherwise defined, meanings of all technical and scientific terms used in the specification are the same as that usually understood by a person skilled in the technical field to which the present invention belongs. Terms used in the specification of the present invention are merely intended to describe objectives of the specific embodiments, and are not intended to limit the present invention. A term "and/or" used in this specification includes any or all combinations of one or more related listed items.

In addition, technical features involved in different embodiments of the present invention described below may be combined together if there is no conflict.

Embodiments of the present invention provide a multi-thread exit method. In the method, an exit identifier and crash determination information of a thread are obtained, both the exit identifier and the crash determination information of the thread are determined, and different destruction modes are selected according to determination results to destroy the thread, thereby avoiding crash and congestion when a multi-thread exits and improving the stability of multi-thread exit.

An application environment of the multi-thread exit method is described below by using an example.

Technical solutions provided in the embodiments of the present invention may be applied to a multi-thread scenario, and may also be applied to multi-process and multi-task scenarios. Implementation processes of the scenarios are similar. In the embodiments of the present application, a multi-thread is used as an example.

For ease of description, a multi-thread exit device is collectively referred to as a processing device. The processing device includes a main thread module and one or more sub-thread modules.

The processing device adopts a typical microprocessor without interlocked pipeline stages (MIPS) processor pipeline system. That is, execution of an instruction is divided into five-stage pipelines: instruction fetch (IF), instruction decoding (ID), execution (EX), memory access (MEM) and write back (WB). The present invention is designed based on the pipeline, and a pipeline stage is deepened, to support hardware multi-threading execution.

The processing device includes a hardware multi-thread instruction fetch device, a hardware multi-thread decoding device, a hardware multi-thread execution device, a hardware multi-thread memory access device, a hardware multi-thread write-back device, a hardware multi-thread register set and a multi-thread control device. Each device supports parallel execution of n hardware threads, and the devices are synchronized.

The hardware multi-thread instruction fetch device completes an update operation of instruction addresses of n hardware threads, implements storage of the instruction addresses and completes instruction fetch operations on the n hardware threads according to an instruction fetch control signal outputted by the multi-thread control device, to output an instruction to the hardware multi-thread decoding device. The hardware multi-thread decoding device completes a decoding operation of the n hardware threads according to instructions of n threads outputted by the hardware multi-thread instruction fetch device and a decoding control signal generated by the multi-thread control device, to output operation control information to be operated and data information to the hardware multi-thread execution device. The hardware multi-thread execution device completes instruction execution of the n threads according to the operation control information and the data information outputted by the hardware multi-thread decoding device and an execution control signal generated by the multi-thread control device, to output data information of an execution result to the hardware multi-thread memory access device. The hardware multi-thread memory access device completes a memory access operation on the n hardware threads according to a memory access control signal generated by the multi-thread control device, and outputs the data information from the hardware multi-thread execution device to the hardware multi-thread write-back device. The hardware multi-thread write-back device outputs data information to be written back and a register address to be written back to the hardware multi-thread register set according to a write-back control signal generated by the multi-thread control device. The hardware multi-thread register set cooperates with the hardware multi-thread decoding device and the hardware multi-thread write-back device to complete a read/write operation on a register set of n hardware threads according to a register control signal outputted by the multi-thread control device. The multi-thread control device controls the execution of each device of the entire hardware multi-thread device to specifically generate the following control signals: generate the instruction fetch control signal and output the instruction fetch control signal to the hardware multi-thread instruction fetch device, generate the decoding control signal and output the decoding control signal to the hardware multi-thread decoding device, generate the execution control signal and output the execution control signal to the hardware multi-thread execution device, generate the memory access control signal and output the memory access control signal to the hardware multi-thread memory access device, generate the write-back control signal and output the write-back control signal to the hardware multi-thread write-back device and generate the register control signal and output the register control signal to the hardware multi-thread register set.

FIG. 1 is an embodiment of a multi-thread exit method according to an embodiment of the present invention. As shown in FIG. 1, the multi-thread exit method includes the following steps:

S10: Obtain an exit identifier and crash determination information of a thread.

The processing device includes a main thread module and one or more sub-thread modules, which can simultaneously process a main thread and one or more sub-threads. The exit identifier is an exit identifier of the one or more sub-threads. The exit identifier may be any value, for example, 1 or 0.

The exit identifier may be alternatively any letter or symbol identifier that can be recognized by a terminal of the exit identifier. When the thread completes execution of a corresponding operation, the exit identifier is outputted, and the thread can be destroyed according to the exit identifier.

When an exception occurs in the thread, for example, the thread is stuck for a reason, and the exit identifier cannot be outputted, other threads remain in a congested state, resulting in a terminal (for example, an electronic device such as a mobile phone, a tablet or a remote control) to be stuck and affecting user experience.

When the foregoing exception occurs in the thread, the crash determination information is determined. If the crash determination information satisfies a preset condition, the thread may be directly destroyed, thereby resolving the problem of congesting the thread and reducing a probability of crash.

S20: Destroy the thread according to the exit identifier and the crash determination information.

When one of the exit identifier and the crash determination information satisfies the preset condition, the thread can be destroyed. If neither of the exit identifier and the crash determination information satisfies the preset condition, the exit identifier and the crash determination information of the thread continue to be obtained, and it is verified whether one of the exit identifier and the crash determination information satisfies the preset condition. Before the exit identifier and the crash determination information of the thread continue to be obtained, the exit identifier or the crash determination information may be updated until one of the exit identifier and the crash determination information satisfies the preset condition, to successfully destroy the thread.

In some embodiments, it may also be set that when both the exit identifier and the crash determination information satisfy the preset condition, the thread is destroyed. When one of the exit identifier and the crash determination information does not satisfy the preset condition, the exit identifier and the crash determination information of the thread continue to be obtained, and it is verified whether both the exit identifier and the crash determination information satisfy the preset condition.

The embodiments of the present invention provide a multi-thread exit method. In the method, an exit identifier and crash determination information of a thread are obtained, both the exit identifier and the crash determination information of the thread are determined, and different destruction modes are selected according to determination results to destroy the thread, thereby avoiding crash and congestion when a multi-thread exits and improving the stability of multi-thread exit.

Figure 2:
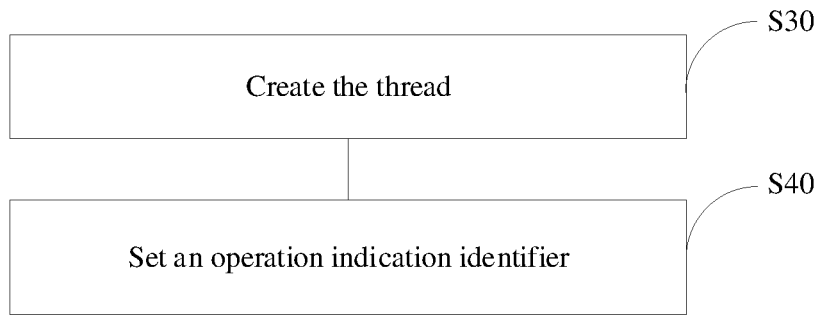
FIG. 2 is a schematic flowchart of a multi-thread exit method of another embodiment according to an embodiment of the present invention.

In some embodiments, before the obtaining an exit identifier and crash determination information of a thread, referring to FIG. 2, the method further includes the following steps:

S30: Create the thread.

Specifically, a Java programming language is adopted to create the thread by inheriting a Thread class. A subclass of the Thread class is first defined, and a run( ) method of the class is rewritten. A method body of this method is a task that the thread needs to complete. The run( ) method is also referred to as a thread execution body. Creating an instance of the subclass of the Thread class is to create a thread object and start the thread, that is, call a start( ) method of the thread.

In some embodiments, the thread is created and started by implementing a Runnable interface. To define an implementation class of the Runnable interface, a run( ) method also needs to be rewritten. The run( ) method is the same as the run( ) method in Thread, which is the execution body of the thread. An instance of the implementation class of the Runnable interface is created, and the instance is used as a target of the Thread to create a Thread object. The Thread object is a real thread object, and finally the thread is started by calling a start( ) method of the thread object.

In some embodiments, the thread may also be created by using Callable and Future or the thread may be created by using a thread pool such as an Executor framework.

In some embodiments, the thread may also be created by adopting another programming language, and different programming languages have different ways of creating the thread, which is not limited herein.

S40: Set an operation indication identifier, where the operation indication identifier is used for instructing the thread to enter an operation state.

Specifically, after or before the thread is created, the operation indication identifier is set, and the operation indication identifier is used for instructing the thread to enter the operation state. The operation indication identifier is used as a global variable. If the thread obtains the operation indication identifier, the thread remains in the operation state, and if the thread does not obtain the operation indication identifier, the thread stops operation and outputs the exit identifier.

Figure 3:
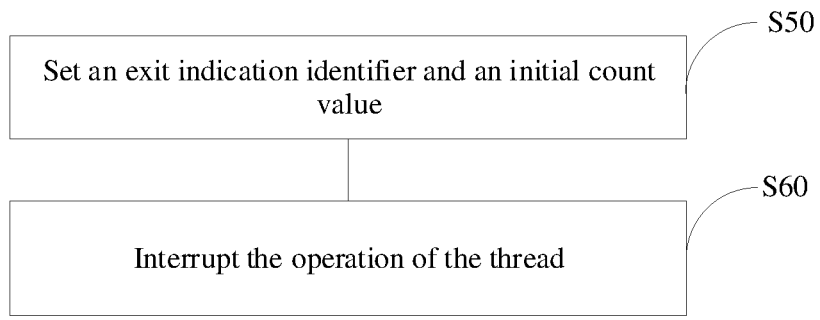
FIG. 3 is a schematic flowchart of a multi-thread exit method of still another embodiment according to an embodiment of the present invention.

To better destroy the thread according to the exit identifier and the crash determination information, avoid crash and congestion when the multi-thread exits and improve the stability of multi-thread exit, in some embodiments, before the obtaining an exit identifier and crash determination information of a thread, referring to FIG. 3, the method further includes the following steps:

S50: Set an exit indication identifier and an initial count value, where the exit indication identifier is used for instructing the thread to enter an exit state and output a first exit identifier, and the initial count value is used for indicating the time point at which the thread is set to enter the exit state.

The exit indication identifier and the operation indication identifier share a position of a first register 76, where when the thread is set to enter the exit state, the position of the first register 76 is set as the exit indication identifier; and when the thread is set to enter the operation state, the position of the first register 76 is set as the operation indication identifier.

Specifically, the exit indication identifier and the operation indication identifier adopt the same variable name. However, assignments of variables corresponding to the exit indication identifier and the operation indication identifier are different. For example, a variable name R is adopted for both the exit indication identifier and the operation indication identifier. The operation indication identifier is represented when R=1, and the exit indication identifier is represented when R=0. That is, when it is assigned that R=1, it indicates that the thread enters the operation state, and when it is assigned that R=0, it indicates that the thread enters the exit state.

The exit indication identifier and the operation indication identifier may be any values, and it only necessary to ensure that the values of the exit indication identifier and the operation indication identifier are different, for example, 1 and 0. The operation indication identifier may be alternatively any letter or symbol identifier that can be recognized by a terminal of the operation indication identifier.

To better destroy the thread, avoid crash and congestion when the multi-thread exits and improve the stability of multi-thread exit, in some embodiments, before the destroying the thread, referring to FIG. 3, the method further includes the following step:

S60: Interrupt the operation of the thread.

After the exit indication identifier and the initial count value are set, the running thread is directly interrupted.

Specifically, the Thread class has a stop( ) to stop the thread. However, the stop( ) method has been deprecated because the stop( ) method is excessively violent and forcibly terminates a thread being executed. In this way, correct release of resources of the thread cannot be ensured. The thread is usually not allowed to complete resource release work. As a result, a program works in an uncertain state. Therefore, in this embodiment, an interrupt( ) method is used to stop the thread. The interrupt( ) method only changes an interrupt state and does not interrupt a running thread. What the method actually completes is to send an interrupt signal to a congested thread, so that the congested thread can exit the congested state. More specifically, if a thread is congested by one of Object.wait, Thread.join and Thread.sleep, the interrupt( ) method of the thread is called in this case, and the thread throws an InterruptedException to interrupt an exception (the thread needs to be prepared to handle the exception in advance), so as to terminate the congested state beforehand. If the thread is not congested, calling the interrupt( ) method does not work. Until wait( ) sleep( ) and join( ) are executed, InterruptedException is thrown immediately, to ensure certainty and stability in a process of interrupting the thread.

Figure 4:
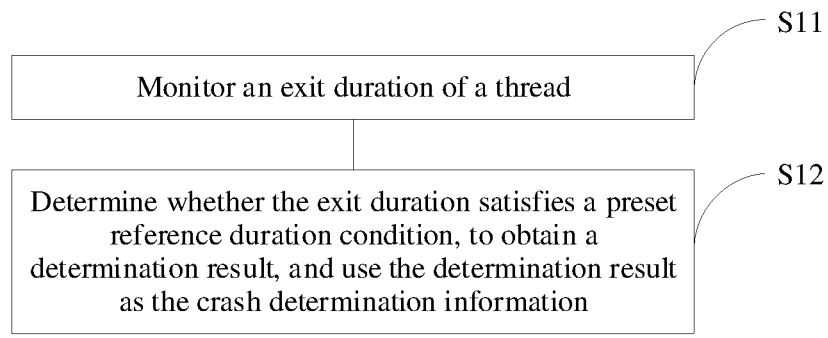
FIG. 4 is a schematic flowchart of S10 in FIG. 1.

To better obtain the crash determination information of the thread, in some embodiments, referring to FIG. 4, S10 includes the following steps:

S11: Monitor an exit duration of the thread, where the exit duration is a duration between a current time point and a time point at which the thread is set to enter an exit state.

Specifically, a corresponding monitoring thread program is run, for each monitoring thread program to enter a cycle calling process. A time of a CPU in which update is performed in each cycle is counted as the current time point, and a time of the CPU when the thread is set to enter the exit state is counted as the time point of the exit state. The exit duration of the thread is obtained according to a difference between the time point of the exit state and the current time point.

S12: Determine whether the exit duration satisfies a preset reference duration condition, to obtain a determination result, and use the determination result as the crash determination information.

Specifically, if the exit duration is less than or equal to a preset reference duration, it is determined that the exit duration satisfies the preset reference duration condition. If the exit duration is greater than the preset reference duration, it is determined that the exit duration does not satisfy the preset reference duration condition, and the determination result is used as the crash determination information. Preferably, the preset reference duration is 2 s to 3 s.

In some embodiments, the determination result may be alternatively obtained by adopting another determination process. For example, if the exit duration is less than or equal to the preset reference duration, it is determined that the exit duration does not satisfy the preset reference duration condition. If the exit duration is greater than the preset reference duration, it is determined that the exit duration satisfies the preset reference duration condition, and the determination result is used as the crash determination information.

Figure 5:
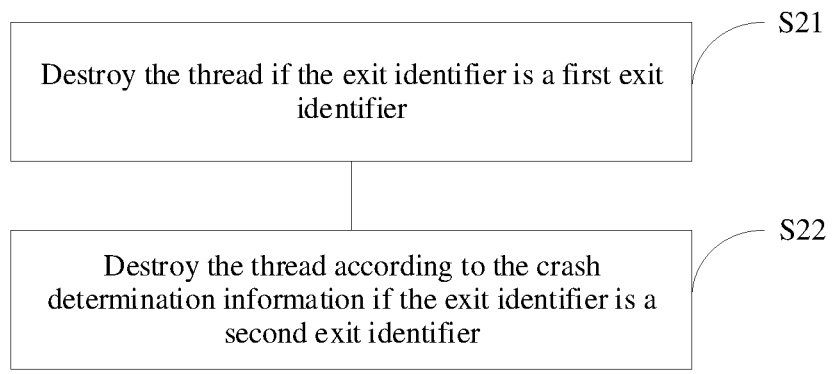
FIG. 5 is a schematic flowchart of S20 in FIG. 1.

To better destroy the thread according to the exit identifier and the crash determination information, in some embodiments, referring to FIG. 5, S20 includes the following steps:

S21: Destroy the thread if the exit identifier is a first exit identifier.

Specifically, the exit identifier includes the first exit identifier and a second exit identifier. The first exit identifier and the second exit identifier adopt the same variable name. However, assignments of variables corresponding to the first exit identifier and the second exit identifier are different. For example, a variable name E is adopted for both the first exit identifier and the second exit identifier. The first exit identifier is represented when E=1, and the second exit identifier is represented when E≠1. When the first exit identifier is obtained, that is, E=1, the thread is directly destroyed.

The first exit identifier and the second exit identifier share a position of a second register 77, where when the thread is set to enter the exit state, the position of the second register 77 is set as the first exit identifier. When the thread is set to enter the operation state, the position of the second register 77 is set as the second exit identifier.

S22: Destroy the thread according to the crash determination information if the exit identifier is a second exit identifier.

Specifically, if the second exit identifier is obtained, it is then determined whether the crash determination information satisfies a preset condition. If the crash determination information satisfies the preset condition, the thread is destroyed. If the crash determination information does not satisfy the preset condition, after a preset operation is performed, the exit duration of the thread continues to be monitored.

Figure 6:
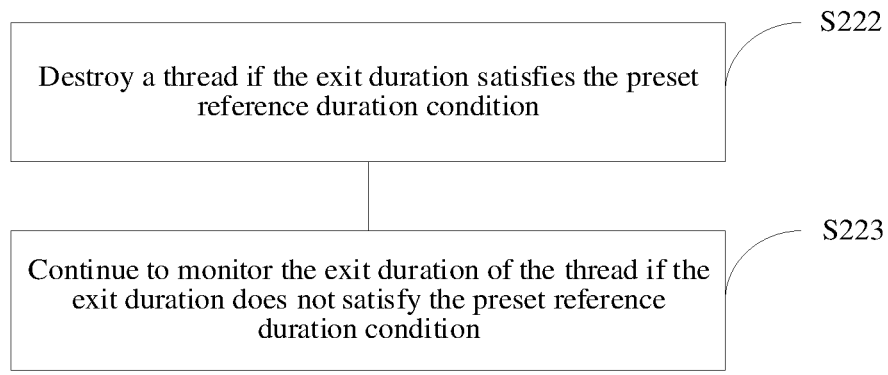
FIG. 6 is a schematic flowchart of S22 in FIG. 5.

To better destroy the thread according to the crash determination information, referring to FIG. 6, S22 includes the following steps:

S222: Destroy the thread if the exit duration satisfies the preset reference duration condition.

Specifically, if the exit duration is greater than the preset reference duration, it is determined that the exit duration satisfies the preset reference duration condition, and the thread is destroyed.

The thread can be destroyed by setting an exit flag to make the thread exit normally. That is, the thread is terminated after the run( ) method is completed, or the interrupt( ) method may be used to interrupt the thread or the stop method may be used to forcibly terminate the thread.

S223: Continue to monitor the exit duration of the thread if the exit duration does not satisfy the preset reference duration condition.

If the exit duration does not satisfy the preset reference duration condition, the exit duration of the thread continues to be monitored after a wait of a preset duration.

The continuing to monitor the exit duration of the thread includes: setting a count value i, and setting the initial count value to 0;

determining whether the count value i is greater than or equal to a preset count threshold; and if the count value i is not greater than or equal to the preset count threshold, waiting the preset duration, updating the count value i according to an assignment formula: i=i+1, and returning to continue to determine whether the updated count value i is greater than or equal to the preset count threshold, where the preset count threshold may be obtained by using the following formula:

$$N = \frac{1000 \times T}{t};$$

where N is the preset count threshold, T is the preset reference duration and t is the preset duration; or destroying the thread if the count value i is greater than or equal to the preset count threshold.

To interrupt the operation of the thread in time, in some embodiments, referring to FIG. 5, S60 includes the following step:

Interrupt the operation of the thread according to operation content of the thread.

In this embodiment, the operation content includes a read/write operation on a file or a read/write operation on network data.

To better interrupt the operation of the thread according to the operation content of the thread, in some embodiments, referring to FIG. 5, the interrupting the operation of the thread according to the operation content of the thread further includes the following steps:

When the operation content is a read/write operation on a file, interrupt the operation of the thread by closing the file.

Specifically, when the operation involves a read/write operation on a file, if data to be read or written is relatively large and congestion tends to occur, the interrupting the operation of the thread is to directly close the file. In this case, the read/write operation in the thread is directly interrupted and exited.

When the operation content is a read/write operation on network data, interrupt the operation of the thread by disabling a network interface.

Specifically, when the operation involves a read/write (recv/send) operation on network data, if a network status is bad or data to be read or written is relatively large and congestion tends to occur, the interrupting the operation of the thread is to directly close a network socket. In this case, the read/write operation in the thread is directly interrupted and exited, thereby exiting a cycle.

It should be noted that in the foregoing embodiments, the foregoing steps are not necessarily performed sequentially. A person of ordinary skill in the art may understand from the description of the embodiments of the present application that in different embodiments, the foregoing steps may be performed differently, that is, may be performed in parallel or may be alternately performed.

Figure 7:
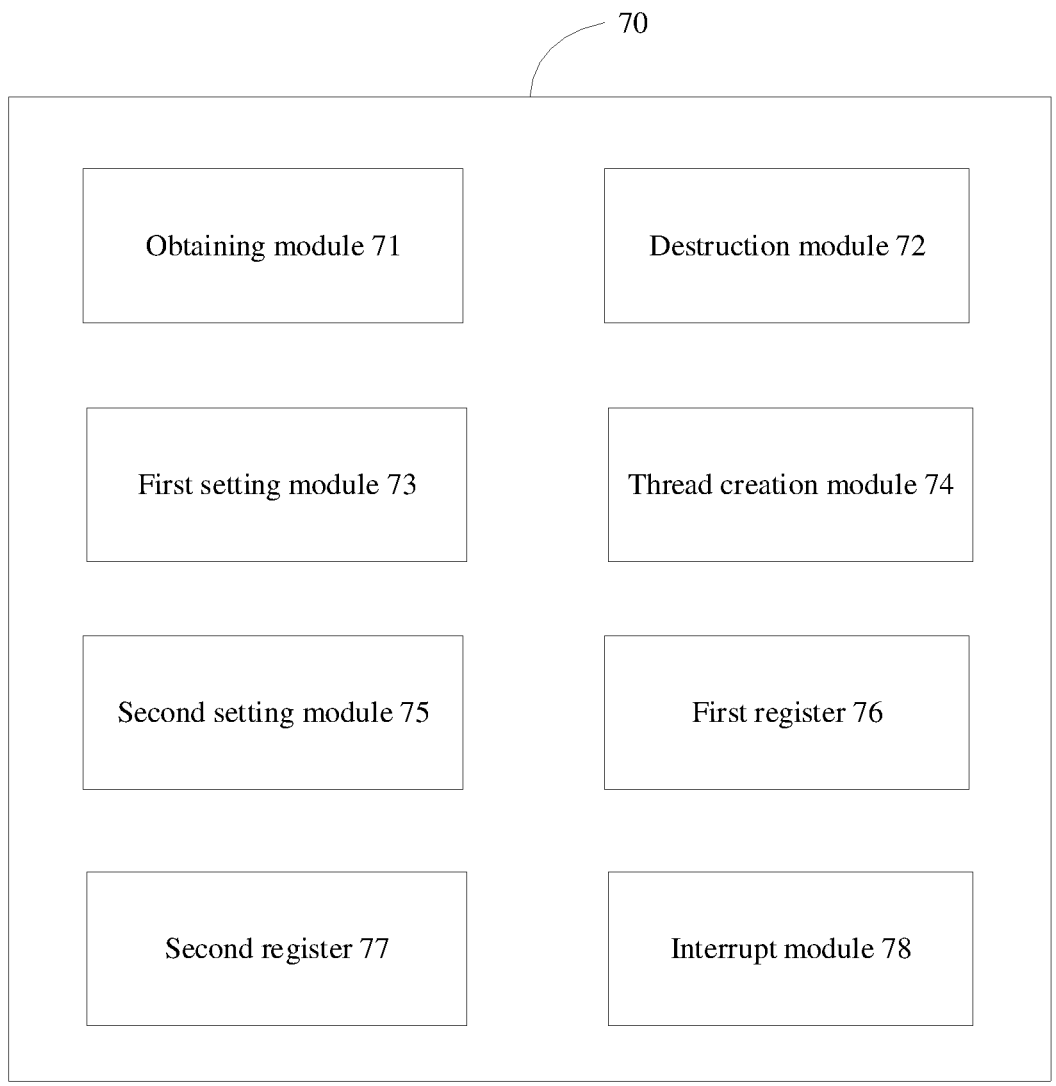
FIG. 7 is a structural block diagram of a multi-thread exit apparatus according to an embodiment of the present invention.

According to another aspect of the embodiments of the present application, the embodiments of the present application provide a multi-thread exit apparatus 70. Referring to FIG. 7, the multi-thread exit apparatus 70 includes an obtaining module 71 and a destruction module 72.

The obtaining module 71 is configured to obtain an exit identifier and crash determination information of a thread.

The destruction module 72 is configured to destroy the thread according to the exit identifier and the crash determination information.

Therefore, in this embodiment, the multi-thread exit apparatus 70 obtains an exit identifier and crash determination information of a thread, determines both the exit identifier and the crash determination information of the thread, and selects different destruction modes according to determination results to destroy the thread, thereby avoiding crash and congestion when a multi-thread exits and improving the stability of multi-thread exit.

In some embodiments, the multi-thread exit apparatus 70 further includes a first setting module 73. The first setting module 73 is configured to set an exit indication identifier and an initial count value, where the exit indication identifier is used for instructing the thread to enter the exit state and output the first exit identifier, and the initial count value is used for indicating the time point at which the thread is set to enter the exit state.

In some embodiments, the multi-thread exit apparatus 70 further includes a thread creation module 74 and a second setting module 75. The second setting module 75 is configured to set an operation indication identifier, where the operation indication identifier is used for instructing the thread to enter an operation state. The thread creation module 74 is configured to create the thread.

In some embodiments, the multi-thread exit apparatus 70 further includes a first register 76 and a second register 77. The first register 76 is configured to store the exit indication identifier and the operation indication identifier. Specifically, the exit indication identifier and the operation indication identifier share a position of the first register 76, where when the thread is set to enter the exit state, the position of the first register 76 is set as the exit indication identifier; and when the thread is set to enter the operation state, the position of the first register 76 is set as the operation indication identifier.

The second register 77 is configured to store the first exit identifier and the second exit identifier. Specifically, the first exit identifier and the second exit identifier share a position of the second register 77, where when the thread is set to enter the exit state, the position of the second register 77 is set as the first exit identifier; and when the thread is set to enter the operation state, the position of the second register 77 is set as the second exit identifier.

In some embodiments, the multi-thread exit apparatus 70 further includes an interrupt module 78. The interrupt module 78 is configured to interrupt operation of the thread.

In some embodiments, the obtaining module 71 includes a detection unit and a determining unit. The detection unit is configured to monitor an exit duration of the thread, where the exit duration is a duration between a current time point and a time point at which the thread is set to enter an exit state. The detection unit is further configured to: set a count value i, and set the initial count value to 0; determine whether the count value i is greater than or equal to a preset count threshold; and if the count value i is not greater than or equal to the preset count threshold, wait the preset duration, update the count value i according to an assignment formula: i=i+1, and return to continue to determine whether the updated count value i is greater than or equal to the preset count threshold; or destroy the thread if the count value i is greater than or equal to the preset count threshold.

The determining unit is configured to: determine whether the exit duration satisfies a preset reference duration condition, to obtain a determination result, and use the determination result as the crash determination information.

In some embodiments, the destruction module 72 includes a first destruction unit and a second destruction unit. The exit identifier includes a first exit identifier and a second exit identifier.

The first destruction unit is configured to destroy the thread if the exit identifier is the first exit identifier.

The second destruction unit is configured to destroy the thread according to the crash determination information if the exit identifier is the second exit identifier.

In some embodiments, the destruction module 72 further includes a first determining unit and a second determining unit. The first determining unit is configured to destroy the thread if the exit duration satisfies the preset reference duration condition. The second determining unit is configured to continue to monitor the exit duration of the thread if the exit duration does not satisfy the preset reference duration condition. The second determining unit is further configured to: if the exit duration does not satisfy the preset reference duration condition, continue to monitor the exit duration of the thread after a wait of a preset duration.

In some embodiments, the interrupt module 78 includes a file operation interrupt unit and a network operation interrupt unit. The file operation interrupt unit is configured to: when the operation content is a read/write operation on a file interrupt the operation of the thread by closing the file. The network operation interrupt unit is configured to: when the operation content is a read/write operation on network data, interrupt the operation of the thread by disabling a network interface.

It should be noted that the multi-thread exit apparatus may perform the multi-thread exit method provided in the embodiments of the present invention, and includes corresponding functional modules for performing the method and beneficial effects. For technical details not described in detail in the multi-thread exit apparatus embodiment, refer to the multi-thread exit method provided in the embodiments of the present invention.

Figure 8:
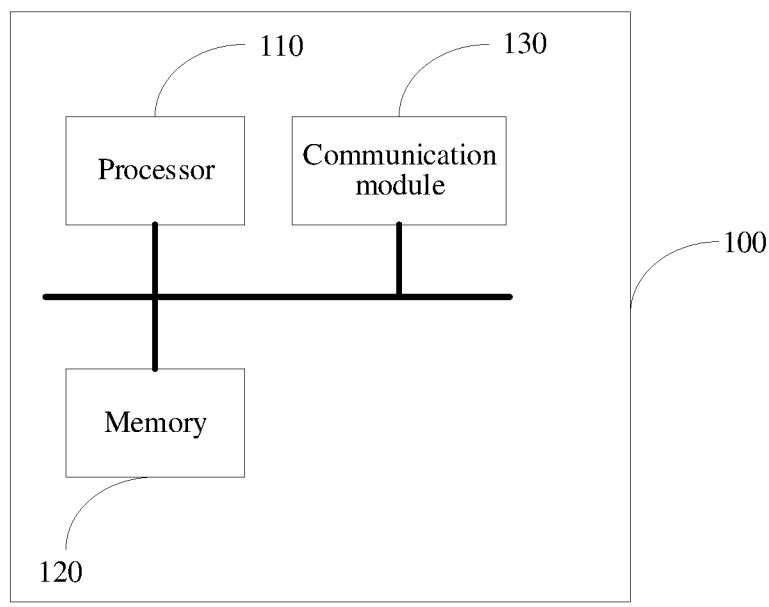
FIG. 8 is a structural block diagram of a terminal according to an embodiment of the present invention.

FIG. 8 is a structural block diagram of a mobile terminal 100 according to an embodiment of the present invention. The mobile terminal is communicatively connected to an unmanned aerial vehicle. The mobile terminal 100 may be configured to implement functions of all or part of functional modules in a main control chip. As shown in FIG. 8, the mobile terminal 100 may include a processor 110, a memory 120 and a communication module 130.

Any two of the processor 110, the memory 120 and the communication module 130 are communicatively connected by a bus.

The processor 110 may be any type of processor 110 that has one or more processing cores, which can perform single-threaded or multi-threaded operations and is configured to analyze instructions to perform operations such as obtaining data, performing logical operation functions, and delivering operation processing results.

The memory 120, as a non-transitory computer-readable storage medium, may be configured to store a non-transitory software program, a non-transitory computer-executable program and a module, for example, program instructions/modules corresponding to the multi-thread exit method in the embodiments of the present invention (for example, the obtaining module 71, the destruction module 72, the first setting module 73, the thread creation module 74, the second setting module 75, the first register 76, the second register 77 and the interrupt module 78 shown in FIG. 7). The processor 110 performs various functional applications and data processing of the multi-thread exit apparatus 70 by running the non-transitory software program, instruction and module stored in the memory 120, that is, implementing the multi-thread exit method described in any of the foregoing method embodiments.

The memory 120 may include a program storage area and a data storage area. The program storage area may store an operating system and an application program that is required for at least one function. The storage data area may store data and the like created according to use of the multi-thread exit apparatus 70. In addition, the memory 120 may include a high-speed random access memory (RAM), and may further include a non-transitory memory, such as at least one magnetic disk memory device, a flash memory device or other non-transitory solid-state memory devices. In some embodiments, the memory 120 optionally includes memories remotely disposed relative to the processor 110, and the remote memories may be connected to the terminal through a network. Examples of the network include, but are not limited to, the Internet, an intranet, a local area network, a mobile communication network and a combination thereof.

The memory 120 stores instructions executable by the at least one processor 110, and the at least one processor 110 is configured to execute the instructions, to implement the multi-thread exit method in any of the foregoing method embodiments, for example, perform the foregoing described method steps 10, 20, 30, 40, 50, 60 and the like, and implement functions of the modules 71 to 78 in FIG. 7.

The communication module 130 is a functional module configured to establish a communication connection and provide a physical channel. The communication module 130 may be any type of wireless or wired communication module 130, including but not limited to a Wi-Fi module or a Bluetooth module. The communication module 130 is configured to be communicatively connected to an unmanned aerial vehicle.

Further, the embodiments of the present invention further provide a non-transitory terminal-readable storage medium, the non-transitory terminal-readable storage medium storing terminal executable instructions, and the terminal executable instructions being executed by one or more processors 110, for example, one processor 110 shown in FIG. 8, so that the one or more processors 110 perform the multi-thread exit method in any of the foregoing method embodiments, for example, perform the foregoing described method steps 10, 20, 30, 40, 50, 60 and the like, and implement functions of the modules 71 to 78 in FIG. 7.

The foregoing described device embodiments are merely examples. The units described as separate parts may or may not be physically separate, and the parts displayed as units may or may not be physical units, may be located in one location, or may be distributed on a plurality of network units. Some or all of the modules may be selected according to actual needs to achieve the objectives of the solutions of the embodiments.

Based on the descriptions of the foregoing implementations, a person of ordinary skill in the art may clearly understand that the implementations may be implemented by software in addition to a universal hardware platform, or by hardware. A person of ordinary skill in the art may understand that all or some of procedures in the foregoing embodiment methods may be implemented by a computer program in a computer program product instructing relevant hardware. The computer program may be stored in a non-transitory computer-readable storage medium, and the computer program includes program instructions. When the program instructions are executed by a related device, the related device may be enabled to execute the procedures of the foregoing method embodiments. The storage medium may be a magnetic disk, an optical disc, a read-only memory (ROM), or a RAM.

For the foregoing product, the multi-thread exit method provided in the embodiments of the present invention may be performed, and corresponding functional modules for performing the multi-thread exit method and beneficial effects thereof are provided. For technical details not described in detail in this embodiment, reference may be made to the multi-thread exit method provided in the embodiments of the present invention.

Finally, it should be noted that the foregoing embodiments are merely used for describing the technical solutions of the present invention, but are not intended to limit the present invention. Under the ideas of the present invention, the technical features in the foregoing embodiments or different embodiments may also be combined, the steps may be performed in any order, and many other changes of different aspects of the present invention also exists as described above, and these changes are not provided in detail for simplicity. It should be understood by a person of ordinary skill in the art that although the present invention has been described in detail with reference to the foregoing embodiments, modifications can be made to the technical solutions described in the foregoing embodiments, or equivalent replacements can be made to some technical features in the technical solutions; and these modifications or replacements will not cause the essence of corresponding technical solutions to depart from the scope of the technical solutions in the embodiments of the present invention.

What is claimed is:

1. A multi-thread exit method, applicable to a mobile terminal, and comprising:
   obtaining a primary exit identifier and crash determination information of a thread; and
   destroying the thread according to the primary exit identifier and the crash determination information;
   before the destroying the thread, the method further comprises:
   interrupting operation of the thread;
   the interrupting operation of the thread comprises:
   interrupting the operation of the thread according to operation content of the thread;
   the operation content comprises a read/write operation on a file or a read/write operation on network data; and
   the interrupting the operation of the thread according to operation content of the thread comprises:
   when the operation content is a read/write operation on a file, interrupting the operation of the thread by closing the file; and
   when the operation content is a read/write operation on network data, interrupting the operation of the thread by disabling a network interface.

2. The method according to claim 1, wherein tale obtaining crash determination information of a thread comprises:
   monitoring an exit duration of the thread, wherein the exit duration is a duration between a current time point and a time point at which the thread is set to enter an exit state; and
   determining whether the exit duration satisfies a preset reference duration condition, to obtain a determination result, and using the determination result as the crash determination information.

3. The method according to claim 2, wherein the primary exit identifier comprises a first exit identifier and a second exit identifier; and
   the destroying the thread according to the primary exit identifier and the crash determination information comprises:
   destroying the thread if the primary exit identifier is the first exit identifier; and
   destroying the thread if the primary exit identifier is the second exit identifier and the exit duration satisfies the preset reference duration condition.

4. The method according to claim 3, wherein when the primary exit identifier is the second exit identifier, the method further comprises:
continuing to monitor the exit duration of the thread when the exit duration does not satisfy the preset reference duration condition.

5. The method according to claim 4, wherein the continuing to monitor the exit duration of the thread when the exit duration does not satisfy the preset reference duration condition comprises:
continuing to monitor the exit duration of the thread after a wait of a preset duration.

6. The method according to claim 5, wherein before the obtaining a primary exit identifier and crash determination information of a thread, the method further comprises:
setting an exit indication identifier and an initial count value, wherein the exit indication identifier is used for instructing the thread to enter the exit state and output the first exit identifier, and the initial count value is used for indicating the time point at which the thread is set to enter the exit state.

7. The method according to claim 6, wherein the monitoring the exit duration of the thread comprises:
setting a count value i, and setting the initial count value to 0;
determining whether the count value i is greater than or equal to a preset count threshold; and
waiting the preset duration when the count value i is not greater than or equal to the preset count threshold, and updating the count value i according to an assignment formula: i=i+1, and returning to continue to determine whether the updated count value i is greater than or equal to the preset count threshold; or
destroying the thread when the count value i is greater than or equal to the preset count threshold.

8. The method according to claim 6, wherein the method further comprises:
creating the thread; and
setting an operation indication identifier, wherein the operation indication identifier is used for instructing the thread to enter an operation state.

9. The method according to claim 8, wherein
the exit indication identifier and the operation indication identifier share a position of a first register, wherein when the thread is set to enter the exit state, the position of the first register is set as the exit indication identifier; and when the thread is set to enter the operation state, the position of the first register is set as the operation indication identifier.

10. The method according to claim 8, wherein
the first exit identifier and the second exit identifier share a position of a second register, wherein when the thread is set to enter the exit state, the position of the second register is set as the first exit identifier; and when the thread is set to enter the operation state, the position of the second register is set as the second exit identifier.

11. A mobile terminal, communicatively connected to aerial vehicle, and comprising:
at least one processor; and
a memory communicatively connected to the at least one processor, the memory storing instructions executable by the at least one processor, the instructions being executed by the at least one processor, to cause the at least one processor to be capable of performing the following steps:
obtaining an primary exit identifier and crash determination information of a thread; and
destroying the thread according to the primary exit identifier and the crash determination information;
before the destroying the thread, the method further comprises:
interrupting operation of the thread;
the interrupting operation of the thread comprises:
interrupting the operation of the thread according to operation content of the thread;
the operation content is a read/write operation on a file or a read/write operation on network data; and
the interrupting the operation of the thread according to operation content of the thread comprises:
when the operation content is a read/write operation on a file, interrupting the operation of the thread by closing the file; and
when the operation content a read/write operation on network data, interrupting the operation of the thread by disabling a network interface.

\* \* \* \* \*